US011848421B2

(12) United States Patent
Fukui

(10) Patent No.: US 11,848,421 B2
(45) Date of Patent: Dec. 19, 2023

(54) ALL-SOLID-STATE BATTERY AND METHOD FOR MANUFACTURING ALL-SOLID-STATE BATTERY

(71) Applicant: HITACHI ZOSEN CORPORATION, Osaka (JP)

(72) Inventor: Hideyuki Fukui, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 129 days.

(21) Appl. No.: 17/422,077

(22) PCT Filed: Dec. 26, 2019

(86) PCT No.: PCT/JP2019/051068
§ 371 (c)(1),
(2) Date: Jul. 9, 2021

(87) PCT Pub. No.: WO2020/145177
PCT Pub. Date: Jul. 16, 2020

(65) Prior Publication Data
US 2022/0102760 A1    Mar. 31, 2022

(30) Foreign Application Priority Data
Jan. 11, 2019   (JP) .................. 2019-003020

(51) Int. Cl.
*H01M 10/0583*   (2010.01)
*H01M 50/548*    (2021.01)
(Continued)

(52) U.S. Cl.
CPC ..... *H01M 10/0583* (2013.01); *H01M 50/178* (2021.01); *H01M 50/186* (2021.01);
(Continued)

(58) Field of Classification Search
CPC .......... H01M 10/0583; H01M 10/186; H01M 10/548; H01M 10/178; H01M 10/533; H01M 10/553
See application file for complete search history.

(56) References Cited

U.S. PATENT DOCUMENTS

| | | |
|---|---|---|
| 2004/0234850 A1 | 11/2004 | Watarai et al. |
| 2016/0240325 A1 | 8/2016 | Tajima et al. |
| 2019/0020054 A1 | 1/2019 | Kawase et al. |

FOREIGN PATENT DOCUMENTS

| | | |
|---|---|---|
| CN | 107210453 A | 9/2017 |
| DE | 102015201281 A1 | 7/2016 |

(Continued)

OTHER PUBLICATIONS

WO2016120060 translation (Year: 2016).*
(Continued)

*Primary Examiner* — Jane J Rhee
(74) *Attorney, Agent, or Firm* — Pillsbury Winthrop Shaw Pittman, LLP

(57) ABSTRACT

The present invention relates to an all-solid-state battery and a method for manufacturing the same. In an example of an embodiment of the all-solid-state battery and the method for manufacturing the same according to the present invention, a positive current collector is folded to electrically connect positive layers while a negative current collector is folded to electrically connect negative layers.

8 Claims, 6 Drawing Sheets

(51) Int. Cl.
  *H01M 50/553*  (2021.01)
  *H01M 50/533*  (2021.01)
  *H01M 50/186*  (2021.01)
  *H01M 50/178*  (2021.01)

(52) U.S. Cl.
  CPC ....... *H01M 50/533* (2021.01); *H01M 50/548* (2021.01); *H01M 50/553* (2021.01)

(56) References Cited

FOREIGN PATENT DOCUMENTS

| | | |
|---|---|---|
| JP | 03-116661 A | 5/1991 |
| JP | 03-127466 A | 5/1991 |
| JP | 2003-123743 A | 4/2003 |
| JP | 3982221 B2 | 9/2007 |
| JP | 2010-067443 A | 3/2010 |
| JP | 2012-038425 A | 2/2012 |
| JP | 2012-243395 A | 12/2012 |
| JP | 2013-120717 A | 6/2013 |
| JP | 2014-093156 A | 5/2014 |
| JP | 2014-130754 A | 7/2014 |
| JP | 2015-133292 A | 7/2015 |
| JP | 2016-154138 A | 8/2016 |
| JP | 2019-021621 A | 2/2019 |
| WO | WO-2016120060 A1 * | 8/2016 .......... H01M 10/045 |
| WO | 2018/016112 A1 | 1/2018 |

OTHER PUBLICATIONS

International Search Report dated Mar. 17, 2020, issued in corresponding International Patent Application No. PCT/JP2019/051068 w/English translation (4 pgs.).

Extended European Search Report dated Sep. 9, 2022, issued in corresponding European Patent Application No. 19909336.0 (60 pgs.).

Notice of Reasons for Refusal drafted Mar. 20, 2023, issued in corresponding Japanese Patent Application No. 2019-003020 with English translation (6 pgs.).

Notice of Reasons for Refusal drated Jul. 11, 2023, issued in corresponding Japanese Patent Application No. 2019-003020 with English translation (10 pgs.).

Notice of Reasons for Refusal dated Oct. 4, 2022, issued in corresponding Japanese Patent Application No. 2019-003020 with English translation (7 pgs.).

* cited by examiner

ALL-SOLID-STATE BATTERY AND METHOD FOR MANUFACTURING ALL-SOLID-STATE BATTERY

CROSS-REFERENCE TO RELATED APPLICATIONS

This application is the U.S. National Stage of PCT/JP2019/051068, filed Dec. 26, 2019, which claims priority to Japanese Patent Application No. 2019-003020, filed Jan. 11, 2019, the entire contents of both of which are herein incorporated by reference in their entireties.

TECHNICAL FIELD

The present invention relates to an all-solid-state battery and a method for manufacturing the same and particularly relates to an all-solid-state battery including a plurality of stacked electrode laminates and a method for manufacturing the same.

BACKGROUND ART

As one form of a battery structure, an all-solid-state battery is available in which a solid electrolyte is used as an electrolyte disposed between an active material on the positive side and an active material on the negative side. All-solid-state batteries are safer than batteries using electrolyte solutions as electrolytes in terms of no possibility of battery leakage and being flame resistant, for example. Moreover, all-solid-state batteries have high energy densities and thus provide large capacities even with small volumes. Such an all-solid-state battery can be used as, for example, a power supply for a motor and an electronic device.

An all-solid-state battery described in Japanese Patent Laid-Open No. 2013-120717 is a laminate of stacked electrode bodies, each including a pair of electrodes and a solid-electrolyte layer disposed therebetween. The negative electrodes and the positive electrodes of the electrode bodies in the laminate are electrically connected in parallel via a parallel current collector, forming the overall all-solid-state battery.

In the all-solid-state battery described in Japanese Patent Laid-Open No. 2013-120717, a current collector for a positive terminal and a current collector for a negative terminal are disposed on the sides of the laminate, the current collectors being used for drawing electricity to the outside, and the parallel current collector is connected to the current collector for the positive terminal and the current collector for the negative terminal. Thus, when electricity is drawn from the current collector for the positive terminal and the current collector for the negative terminal, electrons move in a direction (horizontal direction) that crosses a stacking direction (vertical direction) in the parallel current collector.

In the all-solid-state battery described in Japanese Patent Laid-Open No. 2013-120717, the parallel current collector has a large thickness in order to secure a path of electrons moving in the horizontal direction in the parallel current collector.

SUMMARY OF INVENTION

Technical Problem

In the all-solid-state battery described in Japanese Patent Laid-Open No. 2013-120717, however, the parallel current collectors having large thicknesses in the all-solid-state battery increases the thickness of the overall battery. Moreover, the parallel current collector connected to the current collector for the positive terminal and the current collector for the negative terminal increases the electrical resistance at the connected point, so that electricity is less efficiently drawn from the all-solid-state battery.

The parallel current collector in surface contact with the electrodes of the electrode bodies in the laminate may cause a large interface resistance on the contact surface if the contact is insufficiently made with the electrodes. This may reduce the battery performance. However, the parallel current collector is not sufficiently brought into contact with the electrodes only by simply stacking the electrode bodies and the parallel current collector. Sufficient contact can be obtained by molding or sintering the electrode bodies and the parallel current collector together in advance. Unfortunately, it is difficult to perform the processing for increasing the degree of contact after the formation of the laminate including the stacked electrode bodies and parallel current collectors.

As described above, a conventional all-solid-state battery has factors that may reduce the battery performance. In view of the problem, an object of the present invention is to improve battery performance in an all-solid-state battery and a method of manufacturing the same.

Solution to Problem

In order to solve the problem, an all-solid-state battery as an embodiment according to the present invention includes a plurality of electrode laminates stacked in a thickness direction, the electrode laminates each including a positive layer, a negative layer, and a solid-electrolyte layer disposed between the positive layer and the negative layer, the all-solid-state battery including a positive current collector and a negative current collector, wherein the positive current collector is folded to electrically connect the positive layers of the electrode laminates, and the negative current collector is folded to electrically connect the negative layers of the electrode laminates.

Moreover, the positive current collector is preferably folded into a zigzag-folding pattern so as to electrically connect the positive layers of the electrode laminates, the negative current collector is preferably folded into a zigzag-folding pattern so as to electrically connect the negative layers of the electrode laminates, and the positive current collector and the negative current collector are preferably disposed with folding directions crossing each other.

An all-solid-state battery according to another embodiment of the present invention, the positive current collector preferably has an edge partially protruding as a positive deriving portion for external electrical connection, and the negative current collector preferably has an edge partially protruding as a negative deriving portion for external electrical connection.

An all-solid-state battery according to another embodiment of the present invention preferably further includes a sealant film bonded to at least one surface of each of the positive deriving portion and the negative deriving portion.

An all-solid-state battery according to another embodiment of the present invention preferably further includes an electrode-layer contact member disposed on at least one surface of each of the positive layer and the negative layer of the electrode laminate.

In an all-solid-state battery according to another embodiment of the present invention, the electrode laminates each preferably include a plurality of electrode molded bodies stacked in series connection, the electrode molded bodies each including the positive layer, the negative layer, and the solid-electrolyte layer disposed between the positive layer and the negative layer.

A method for manufacturing an all-solid-state battery according to an example of the embodiment of the present invention, in a method for manufacturing the all-solid-state battery for an all-solid-state battery for manufacturing the embodiment, includes: a first step of disposing a positive current collector/negative current collector and a first electrode laminate such that a positive layer/negative layer of the first electrode laminate is in contact with the positive current collector/negative current collector; a second step of disposing the negative current collector/positive current collector in contact with the negative layer/positive layer of the first electrode laminate; a third step of disposing a second electrode laminate such that a negative layer/positive layer of the second electrode laminate is in contact with the negative current collector/positive current collector in the second step; a fourth step of folding the positive current collector/negative current collector in contact with the positive layer/negative layer of the second electrode laminate; a fifth step of disposing a third electrode laminate such that a positive layer/negative layer of the third electrode laminate is in contact with the positive current collector/negative current collector in the fourth step; and a sixth step of folding the negative current collector/positive current collector in contact with the negative layer/positive layer of the third electrode laminate in the fifth step. Moreover, a method for manufacturing an all-solid-state battery according to another embodiment of the present invention, a folding direction in the fourth step and a folding direction in the sixth step cross each other.

Advantageous Effects of Invention

According to the all-solid-state battery of the present invention, the positive current collector and the negative current collector are folded into a zigzag-folding pattern while electrically connecting the positive layers and the negative layers. Thus, even in the case of thin current collectors, the positive layers and the negative layers can be connected in parallel. This reduces the thickness of the overall all-solid-state battery.

DESCRIPTION OF EMBODIMENT

Figure 1:
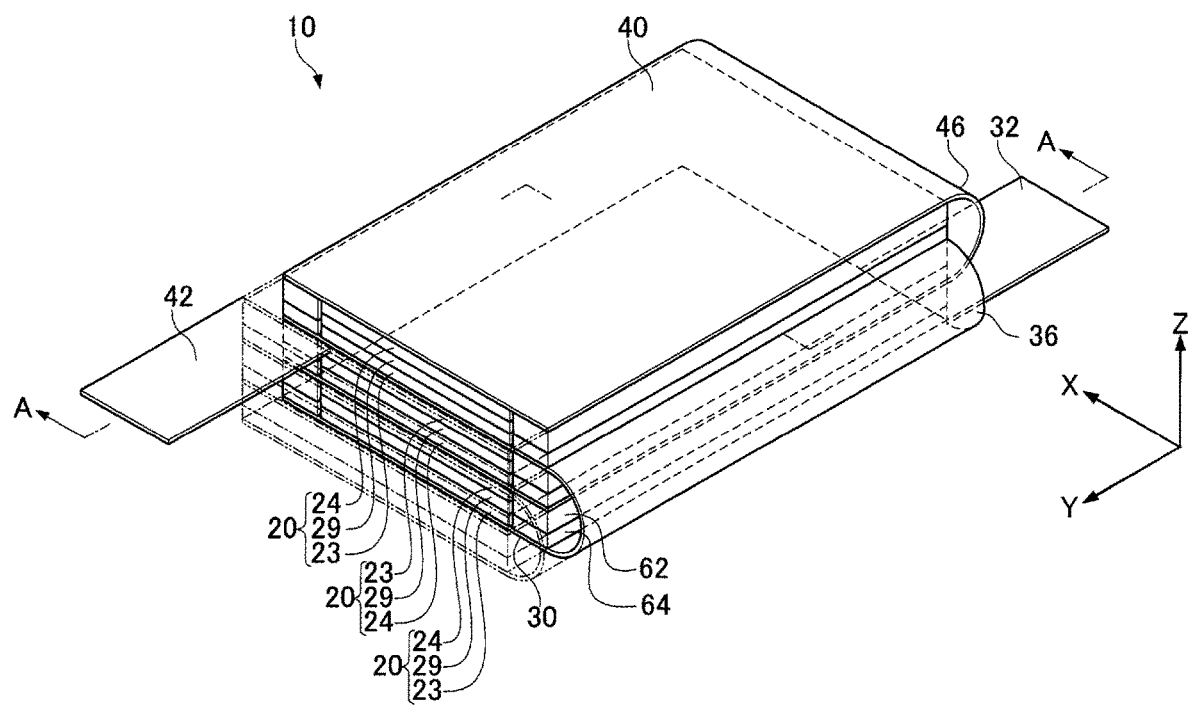
FIG. 1 is a perspective view schematically illustrating the laminated structure of an all-solid-state battery in an example of an embodiment according to the present invention.

FIG. 1 is a perspective view schematically illustrating the laminated structure of an all-solid-state battery 10 according to an example of an embodiment of the present invention. As illustrated in FIG. 1, the all-solid-state battery 10 includes a plurality of electrode laminates (three electrode laminates in this structure) 20 stacked in a thickness direction Z. A positive current collector 30 or a negative current collector 40 is disposed between the electrode laminates 20.

The electrode laminate 20 includes a positive layer 23, a negative layer 24, and a solid-electrolyte layer 29 disposed between the positive layer 23 and the negative layer 24. As illustrated in FIG. 1, the electrode laminates 20 are stacked with both sides alternately placed face up and down (the positive layer 23 and the negative layer 24 are alternately placed as the upper side in FIG. 1). The positive current collector 30 is placed to electrically connect the positive layers 23 of the electrode laminates 20. Likewise, the negative current collector 40 is placed to electrically connect the negative layers 24 of the electrode laminates 20.

The positive current collector 30 is disposed under the positive layer 23 of the lowermost electrode laminate 20 in FIG. 1 and is electrically connected to the positive layer 23. Furthermore, the positive current collector 30 is folded into a zigzag-folding pattern so as to be guided between the positive layer 23 of the central electrode laminate 20 and the positive layer 23 of the uppermost electrode laminate 20 via a bent portion 36. Thus, the positive current collector 30 electrically connects the lowermost positive layer 23 to the uppermost positive layer 23 and the central positive layer 23.

The negative current collector 40 is placed between negative layer 24 of the central electrode laminate 20 and the negative layer 24 of the lowermost electrode laminate 20 and electrically connects the negative layers 24. Furthermore, the negative current collector 40 is folded into a zigzag-folding pattern so as to be guided over the negative layer 24 of the uppermost electrode laminate 20 via a bent portion 46. Thus, the negative current collector 40 electrically connects the uppermost negative layer 24 to the lowermost negative layer 24 and the central negative layer 24.

In this configuration, the folding direction (X direction in FIG. 1) of the positive current collector 30 and the folding direction (Y direction in FIG. 1) of the negative current collector 40 cross each other. Thus, the bent portion 36 of the positive current collector 30 protrudes from the electrode laminate 20 in the X direction while the bent portion 46 of the negative current collector 40 protrudes from the electrode laminate 20 in the Y direction. This prevents the bent portion 36 of the positive current collector 30 and the bent portion 46 of the negative current collector 40 from coming into contact with each other. In other words, the positive electrode and the negative electrode of the all-solid-state battery 10 are not internally short-circuited.

The lowermost part of the positive current collector 30 in the thickness direction Z in FIG. 1 has an edge (near a viewer on the right end of the positive current collector 30 in the Y direction in FIG. 1) partially protruding to the outside of the electrode laminate 20 (Y direction) into a tab-shaped positive deriving portion 32. The uppermost part of the negative current collector 40 has an edge (remote from the viewer on the left end of the negative current collector 40 in the Y direction in FIG. 1) partially protruding to the outside of the electrode laminate 20 (Y direction) into a tab-shaped negative deriving portion 42. Electricity of the all-solid-state battery 10 is drawn to the outside from the positive deriving portion 32 and the negative deriving portion 42.

Figure 2:
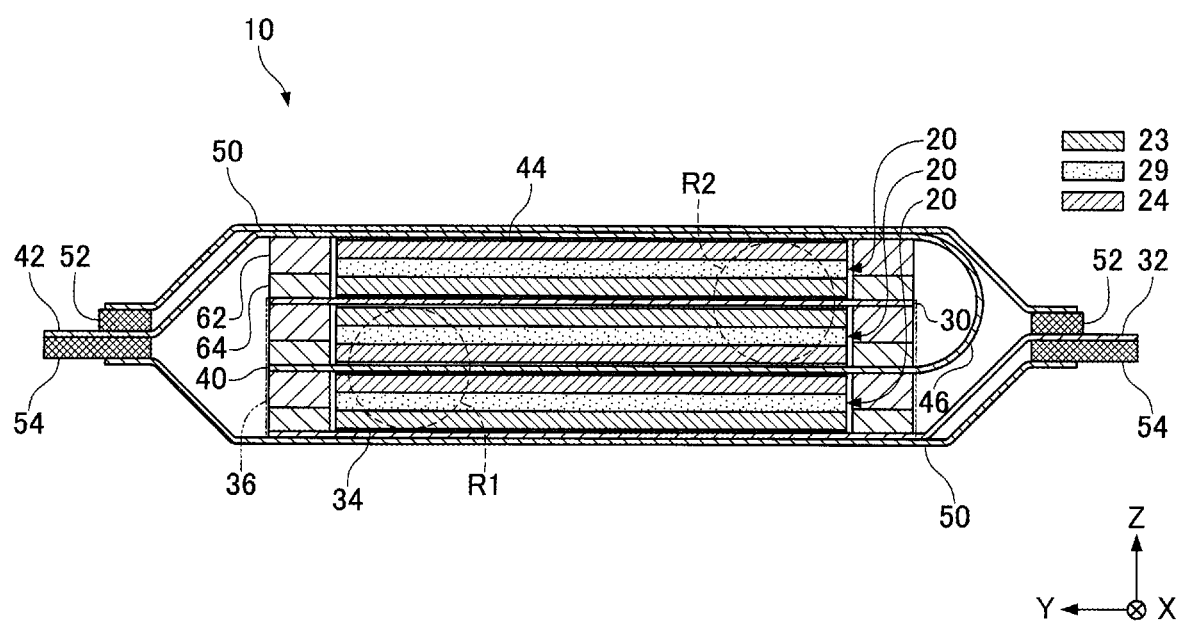
FIG. 2 is a cross-sectional view illustrating the all-solid-state battery that has the laminated structure of FIG. 1 and is covered with a housing.

FIG. 2 illustrates the all-solid-state battery 10 that has the laminated structure of FIG. 1 and is covered with a housing 50. FIG. 2 illustrates a cross-sectional structure of the all-solid-state battery 10 in a section taken along line A-A of FIG. 1. As illustrated in FIG. 2, insulators 62 are disposed on the sides of the electrode laminate 20, so that the sides of the layers (the positive layer 23, the negative layer 24, and the solid-electrolyte layer 29) constituting the electrode laminate 20 are electrically insulated from the outside. The insulators 62 may be each bonded to the surface of the positive current collector 30 or the negative current collector 40 with an adhesive member 64 (e.g., double-sided tape). In FIG. 1, virtual lines indicate portions of the insulator 62 and the adhesive member 64 near the viewer of FIG. 1 (the lower left in FIG. 1).

The housing 50 covering the stacked electrode laminates 20 may be, for example, an aluminum-laminated package. In this case, the stacked electrode laminates 20, the positive current collector 30, and the negative current collector 40 are entirely covered with the aluminum-laminated package and are vacuum-sealed with only the positive deriving portion 32 and the negative deriving portion 42 exposed to the outside. This allows the positive deriving portion 32 and the negative deriving portion 42 to act as leads for drawing the electricity of the all-solid-state battery 10 to the outside.

As has been discussed, the positive deriving portion 32 and the negative deriving portion 42 are portions protruding from the edges of the positive current collector 30 and the negative current collector 40, so that the positive deriving portion 32 and the negative deriving portion 42 can be used as leads. This can efficiently draw electricity to the outside.

The positive current collector 30 and the negative current collector 40 are desirably made of sufficiently thin metal foil (e.g., 10 to 20 μm in thickness). However, such metal foil is not strong enough to be used as a terminal for external connection. This is because such metal foil partially exposed as the positive deriving portion 32 and the negative deriving portion 42 to the outside of the housing 50 is likely to be easily broken, for example. Thus, as illustrated in FIG. 2, a reinforcing sealant film 54 is bonded over one surface (the underside in FIG. 2) of each part exposed from the positive deriving portion 32 and the negative deriving portion 42 to the outside of the housing 50. If the reinforcing sealant film 54 is bonded to be an integral unit with the positive deriving portion 32 and the negative deriving portion 42 by, for example, heat seal, the mechanical strength of the positive deriving portion 32 and the negative deriving portion 42 is reinforced by the reinforcing sealant film 54 (e.g., synthetic resin), thereby eliminating fragility.

Furthermore, a drawing-portion sealant film 52 is bonded to the surfaces (the top surfaces in FIG. 2) of the positive deriving portion 32 and the negative deriving portion 42 opposite to the reinforcing sealant film 54. The drawing-portion sealant film 52 covers a range smaller than the reinforcing sealant film 54. Moreover, the top surfaces of the positive deriving portion 32 and the negative deriving portion 42 with the drawing-portion sealant film 52 bonded thereon are partially exposed to be used as terminals or leads for external electrical connection. As illustrated in FIG. 2, at portions protruding from the positive deriving portion 32 and the negative deriving portion 42 to the outside of the housing 50, the drawing-portion sealant film 52 and the reinforcing sealant film 54 provide sealing between the housing 50 and the positive deriving portion 32 and the negative deriving portion 42. Specifically, the drawing-portion sealant film 52 provides sealing between the top surfaces of the positive deriving portion 32 and the negative deriving portion 42 and the ceiling side (upper part) of the housing 50 while the reinforcing sealant film 54 provides sealing between the undersides of the positive deriving portion 32 and the negative deriving portion 42 and the bottom side (lower part) of the housing 50.

Figure 3:
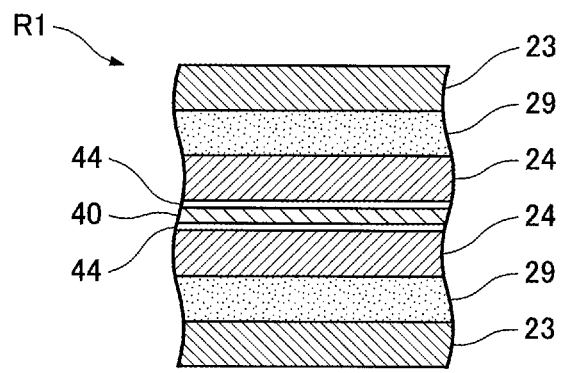
FIG. 3 is an enlarged cross-sectional view illustrating a negative current collector in FIG. 2 and the upper and lower regions thereof.

FIG. 3 is an enlarged cross-sectional view of an area R1 of FIG. 2, illustrating a structure of the negative current collector 40 and the two electrode laminates 20 vertically holding the negative current collector 40. As has been discussed, the negative current collector 40 is disposed between the negative layer 24 of the upper electrode laminate 20 and the negative layer 24 of the lower electrode laminate 20. As illustrated in FIG. 3, an electrode-layer contact member 44 of the negative side is disposed between the negative current collector 40 and the upper negative layer 24 and between the negative current collector 40 and the lower negative layer 24. Thus, the negative current collector 40 is electrically connected to the negative layer 24 via the electrode-layer contact member 44.

Figure 4:
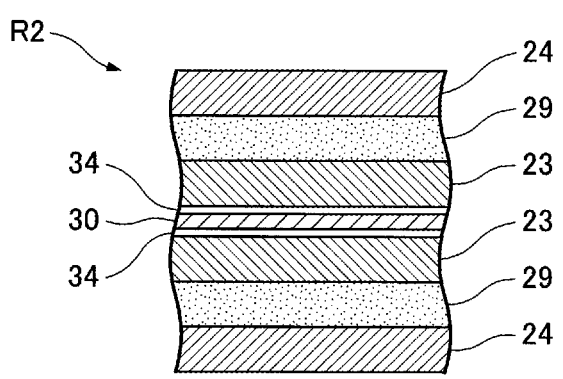
FIG. 4 is an enlarged cross-sectional view illustrating a positive current collector in FIG. 2 and the upper and lower regions thereof.

FIG. 4 is an enlarged cross-sectional view of an area R2 of FIG. 2, illustrating a structure of the positive current collector 30 and the two electrode laminates 20 vertically holding the positive current collector 30. As has been discussed, the positive current collector 30 is disposed between the positive layers 23 of the upper electrode laminate 20 and the positive layer 23 of the lower electrode laminate 20. As illustrated in FIG. 4, an electrode-layer contact member 34 of the positive side is disposed between the positive current collector 30 and the upper positive layer 23 and between the positive current collector 30 and the lower positive layer 23. Thus, the positive current collector 30 is electrically connected to the positive layer 23 via the electrode-layer contact member 34.

The electrode-layer contact member 34 of the positive side and the electrode-layer contact member 44 of the negative side in FIGS. 3 and 4 are bonded to the electrode laminates 20 in advance before the electrode laminates 20 are stacked. Specifically, when each of the electrode laminates 20 is fabricated, the electrode-layer contact member 34 of the positive side is bonded in contact with the surface of the positive layer 23 of the electrode laminate 20 while the electrode-layer contact member 44 of the negative side is bonded in contact with the surface of the negative layer 24. The electrode-layer contact members are not bonded after the electrode laminates 20 are stacked. Since the electrode-layer contact members are bonded during the fabrication of each of the electrode laminates 20, the positive layers 23 and the negative layers 24 can be sufficiently brought into contact with the electrode-layer contact members 34 and 44 by collectively molding or sintering the electrode-layer contact members 34 and 44 and the electrode laminates 20 in advance. This can reduce an interface resistance between the positive layers 23 and the negative layers 24 and the electrode-layer contact members 34 and 44.

If the electrode-layer contact member 34 of the positive side, the electrode-layer contact member 44 of the negative side, the positive current collector 30, and the negative current collector 40 are all metallic, a metallic contact is made between the electrode-layer contact members 34 and 44 and the positive current collector 30 and the negative current collector 40, resulting in a small contact resistance. Thus, the electrode-layer contact members 34 of the positive side and the electrode-layer contact members 44 of the negative side are bonded in contact with the electrode laminates 20, thereby efficiently drawing electricity through the positive current collector 30 and the negative current collector 40 without causing a large resistance in a flow of electricity from the positive layer 23 or the negative layer 24 to the positive current collector 30 or the negative current collector 40.

Figure 5:
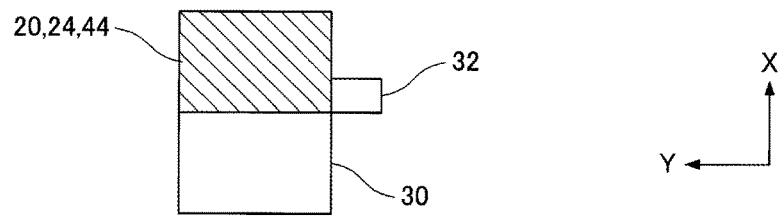
FIG. 5 is a plan view illustrating a first step of a method for manufacturing the all-solid-state battery in an example of the embodiment according to the present invention.

FIGS. 5 to 10 illustrate a method for manufacturing the all-solid-state battery according to an example of the embodiment of the present invention. These drawings each illustrate a completed state of a described step. In a first step, as illustrated in the plan view of FIG. 5, the first electrode laminate 20 is disposed as the lowermost electrode laminate on the positive current collector 30 extended flat. The positive deriving portion 32 provided on a portion of the edge of the positive current collector 30 (one end in the Y direction in FIG. 5) protrudes from the edge of the electrode laminate 20 in plan view. At this point, the electrode laminate 20 is disposed such that the positive layer 23 is in contact with the positive current collector 30. As illustrated in FIG. 5, the negative layer 24 and the electrode-layer contact member 44 of the negative side disposed on the surface of the negative layer 24 appear on the top surface of the electrode laminate 20. As has been discussed, the electrode-layer contact member 44 is bonded to the surface of the negative layer 44 in advance when the electrode laminate 20 is fabricated.

For the sake of simplification, in FIG. 5, the positive current collector 30 has the same dimensions as the electrode laminate 20 in one direction (Y direction) in one plane and is twice larger than the electrode laminate 20 in another direction (X direction, the folding direction of the positive current collector 30 in a fourth step, which will be described later). However, it is actually desirable to set the positive current collector 30 slightly larger than twice the dimensions of the electrode laminate 20 in the X direction in order to obtain the bent portion 36 illustrated in FIGS. 1 and 2. Furthermore, the positive current collector 30 is actually slightly larger than the electrode laminate 20 also in the Y direction, and the insulators 62 in FIG. 2 are bonded in advance with the adhesive members 64 to the edges of the surface of the positive current collector 30 so as to surround a region corresponding to the dimensions of the electrode laminate 20 in plan view. The electrode laminate 20 is preferably disposed in a part surrounded by the insulators 62 in one plane. A description about redundant dimensions for the bent portion 36 of the positive current collector 30 and the bent portion 46 of the negative current collector 40, the insulators 62, and the adhesive members 64 is omitted for simplicity also in FIGS. 6 to 10.

Figure 6:
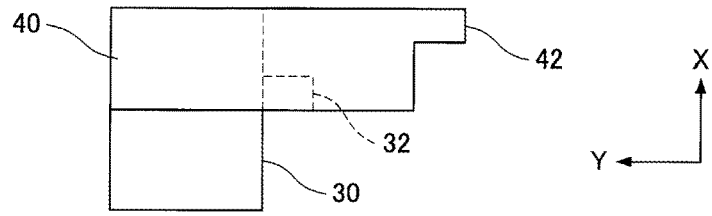
FIG. 6 is a plan view illustrating a second step following the first step of FIG. 5.

Subsequently, in a second step, the negative current collector 40 is disposed as illustrated in FIG. 6 on the negative layer 24 (to be accurate, the electrode-layer contact member 44 of the negative side disposed on the surface of the negative layer 24) appearing on the top surface of the electrode laminate 20 disposed in the first step, and the negative current collector 40 is brought into contact with the negative layer 24. In FIG. 6, the negative current collector 40 has the same dimensions as the electrode laminate 20 in the X direction and is twice larger than the electrode laminate 20 (to be accurate, the negative current collector 40 is slightly larger than the electrode laminate 20 both in the X direction and the Y direction) in the Y direction (the folding direction of the negative current collector 40 in a sixth step, which will be described later). Like the positive current collector 30, the negative current collector 40 is actually larger than the illustrated dimensions both in the X direction and the Y direction. The negative deriving portion 42 is provided on one end of the edge of the negative current collector 40 in the Y direction.

Figure 7:
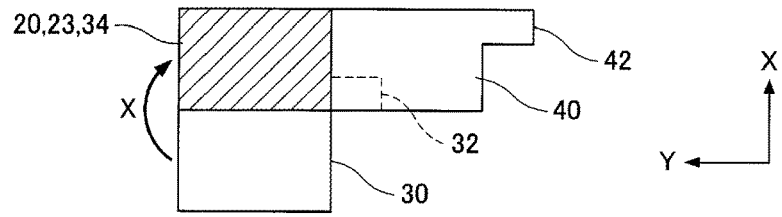
FIG. 7 is a plan view illustrating a third step following the second step of FIG. 6.

Subsequently, in a third step, the second electrode laminate 20 is disposed as illustrated in FIG. 7 on the negative current collector 40 disposed in the second step. At this point, the electrode laminate 20 is disposed with the negative layer 24 at the underside in contact with the negative current collector 40. Thus, as illustrated in FIG. 7, the positive layer 23 and the electrode-layer contact member 34 of the positive side appear on the top surface of the electrode laminate 20, the electrode-layer contact member 34 being bonded in advance on the surface of the positive layer 23. The insulators 62 are bonded in advance to the surface of the negative current collector 40 with the adhesive members 64 so as to surround the placement area of the electrode laminate 20. The electrode laminate 20 is disposed in the area surrounded by the insulators 62.

Figure 8:
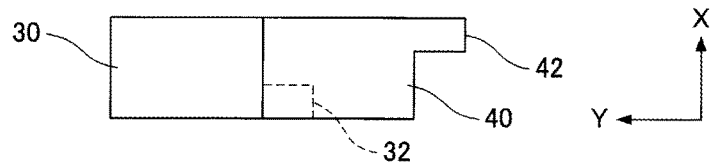
FIG. 8 is a plan view illustrating a fourth step following the third step of FIG. 7.

Thereafter, in a fourth step, the positive current collector 30 is folded in the folding direction (X direction) indicated by an arrow in FIG. 7 such that the positive layer 23 (the electrode-layer contact member 34 of the positive side) appearing on the top surface of the electrode laminate 20 disposed in the third step is covered with a portion where the electrode laminate 20 is not disposed on the positive current collector 30 disposed in the first step. Hence, as illustrated in FIG. 8, the positive current collector 30 appears on the top surface in plan view. The positive current collector 30 is in contact with the positive layer 23 on the top surface of the second electrode laminate 20.

Figure 9:
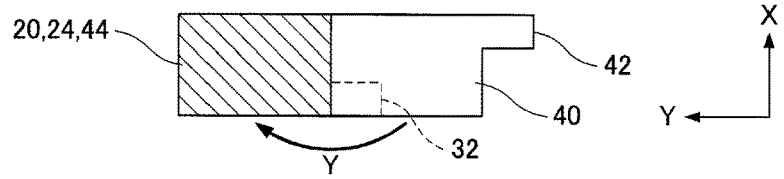
FIG. 9 is a plan view illustrating a fifth step following the fourth step of FIG. 8.

Subsequently, in a fifth step, the third electrode laminate 20 is disposed as illustrated in FIG. 8 on the positive current collector 30 that is folded to appear on the top surface in the fourth step. At this point, the electrode laminate 20 is disposed with the positive layer 23 at the underside in contact with the positive current collector 30. Thus, as illustrated in FIG. 9, the negative layer 24 and the electrode-layer contact member 44 of the negative side appear on the top surface of the electrode laminate 20. Also in FIG. 9, the insulators 62 bonded in advance to the surface of the positive current collector 30 are not illustrated.

Figure 10:
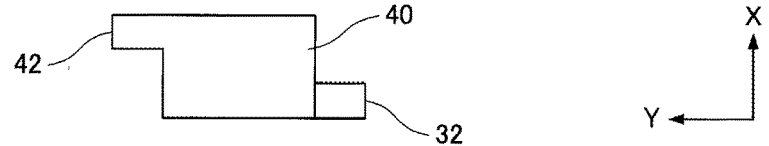
FIG. 10 is a plan view illustrating a sixth step following the fifth step of FIG. 9.

Thereafter, in a sixth step, the negative current collector 40 is folded in the folding direction (Y direction) indicated by an arrow in FIG. 9 such that the negative layer 24 (the electrode-layer contact member 44 of the negative side) appearing on the top surface of the electrode laminate 20 disposed in the fifth step is covered with a portion where the electrode laminate 20 is not disposed on the negative current collector 40 disposed in the second step. Hence, as illustrated in FIG. 10, the negative current collector 40 appears on the top surface in plan view. The negative current collector 40 is in contact with the negative layer 24 on the top surface of the uppermost second electrode laminate 20. At this point, the negative deriving portion 42 provided on one end of the edge of the negative current collector 40 in the Y direction also appears on the top surface.

The all-solid-state battery 10 identical to the laminated structure of the perspective view in FIG. 1 is obtained by the foregoing steps. The all-solid-state battery 10 is covered with the housing 50, e.g., an aluminum-laminated package as illustrated in FIG. 2. The drawing-portion sealant films 52 and the reinforcing sealant films 54, which are not illustrated in FIGS. 5 to 10, are desirably attached to the positive deriving portion 32 and the negative deriving portion 42 in advance as illustrated in FIG. 2. Specifically, the reinforcing sealant film 54 is preferably attached to one surface of the positive deriving portion 32 of the positive current collector 30 and the drawing-portion sealant film 52 is preferably attached to the other surface before the positive current collector 30 is disposed in the first step. Similarly, the reinforcing sealant film 54 is preferably attached to one surface of the negative deriving portion 42 of the negative current collector 40 and the drawing-portion sealant film 52 is preferably attached to the other surface before the negative current collector 40 is disposed in the second step.

In the foregoing steps, the positive current collector 30 is disposed as the lowermost current collector while the negative current collector 40 is disposed as the uppermost current collector. However, the all-solid-state battery 10 may be manufactured by switching positive/negative electrodes such that the negative current collector 40 is disposed as the lowermost current collector while the positive current collector 30 is disposed as the uppermost current collector.

In the all-solid-state battery 10 manufactured according to the present embodiment by the manufacturing method including the foregoing steps, the positive current collector 30 and the negative current collector 40 are each folded into a zigzag-folding pattern while electrically connecting the positive layers 23 and the negative layers 24. Thus, the positive current collector 30 and the negative current collector 40 that connect the positive layers and the negative layers in parallel can be, for example, thin metal foil having a thickness of on the order of 10 μm, thereby reducing the thickness of the overall all-solid-state battery 10. Furthermore, the folding directions of the positive current collector 30 and the negative current collector 40 cross each other, thereby preventing a short circuit between the positive current collector 30 and the negative current collector 40 in the all-solid-state battery 10.

Moreover, a manufacturer of the all-solid-state battery 10 can fabricate each of the electrode laminates 20 in advance before the step of stacking the electrode laminates 20 is started. Thus, the quality of the electrode laminates 20 can be inspected in advance, so that only the conforming electrode laminates 20 can be actually used so as to improve the manufacturing yields of the all-solid-state battery 10.

In the all-solid-state battery 10 of the present embodiment, a part of the positive current collector 30 serves as the positive deriving portion 32 and a part of the negative current collector 40 serves as the negative deriving portion 42. The positive deriving portion 32 and the negative deriving portion 42 electrically connect the all-solid-state battery 10 to the outside. With this configuration, the positive current collector 30 and the negative current collector 40 directly transmit electricity to the outside without using additional members, thereby preventing an electrical resistance from excessively increasing in the electrical connection between the all-solid-state battery 10 and the outside.

Since the sealant film (the drawing-portion sealant film 52 or the reinforcing sealant film 54) is bonded to at least one surface of each of the positive deriving portion 32 and the negative deriving portion 42, the sealant film reinforces the mechanical strength of the positive deriving portion 32 and the negative deriving portion 42 even if the positive current collector 30 and the negative current collector 40 are thin metal foil.

Furthermore, the electrode-layer contact members 34 and 44 are disposed on the surfaces of the positive layers 23 and the negative layers 24, and the electrode-layer contact members 34 and 44 hold the positive current collector 30 and the negative current collector 40 interposed therebetween. Thus, the electrode-layer contact members 34 and 44 are in contact with the positive layers 23 and the negative layers 24. Moreover, a contact between the electrode-layer contact members 34 and 44 and the positive current collector 30 or the negative current collector 40 is a contact between conductors such as a metal, thereby reducing an interface resistance between the layers in the all-solid-state battery 10.

Figure 11:
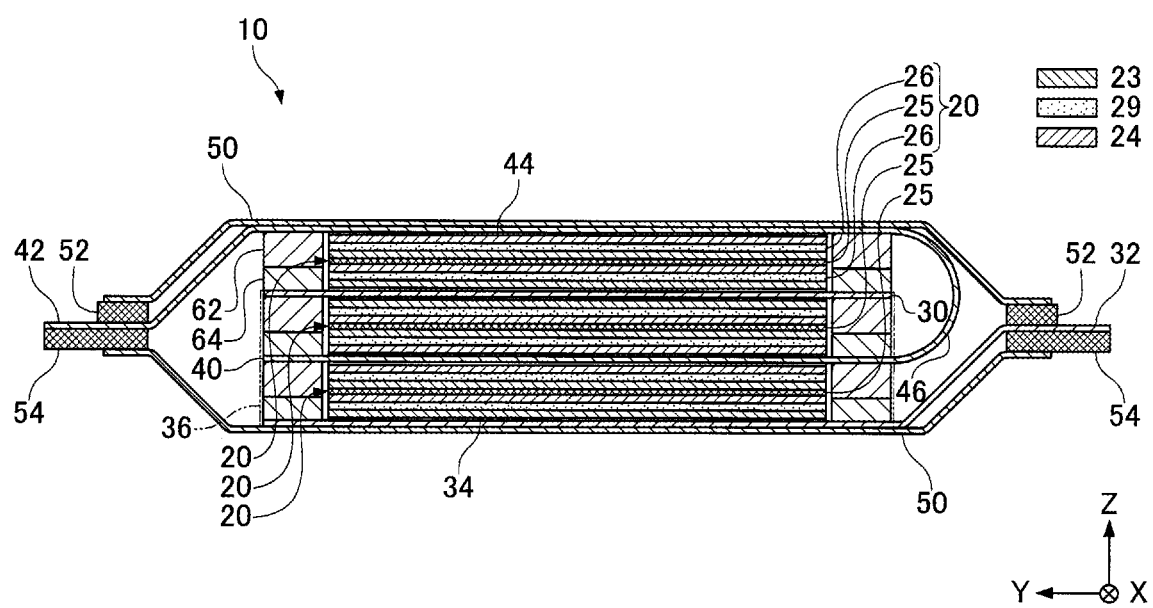
FIG. 11 is a cross-sectional view schematically illustrating the laminated structure of an all-solid-state battery in another example of the embodiment according to the present invention.

In the foregoing embodiment, one electrode laminate 20 includes one positive layer 23, one negative layer 24, and one solid-electrolyte layer 29. The electrode laminate 20 may include multiple positive layers 23, multiple negative layers 24, and multiple solid-electrolyte layers 29. For example, as illustrated in FIG. 11, the electrode laminate 20 may include multiple (two) electrode molded bodies 26 stacked in series connection, the electrode molded body 26 including the positive layer 23, the negative layer 24, and the solid-electrolyte layer 29 interposed between the positive layer 23 and the negative layer 24. In this case, the electrode laminate 20 includes the two positive layers 23, the two negative layers 24, and the two solid-electrolyte layers 29. Between the electrode molded bodies 26 connected in series in the electrode laminate 20, a series current collector 25 is disposed. Specifically, the series current collector 25 is disposed at the boundary between the two electrode molded bodies 26 so as to electrically connect the positive layer 23 of one of the electrode molded bodies 26 and the negative layer 24 of the other electrode molded body 26. In FIG. 11, the two electrode molded bodies 26 connected in series constitute the electrode laminate 20. The three or more electrode molded bodies 26 may be connected in series.

The electrode molded bodies 26 stacked in series connection are used as the electrode laminate 20, thereby extending the ranges of the capacity and the output voltage of the all-solid-state battery 10.

In the foregoing embodiment, the three electrode laminates 20 are stacked. Four or more electrode laminates 20 may be stacked according to necessary battery performance (including dimensions, an energy density, a capacity, and an output voltage). If four or more electrode laminates 20 are stacked, the positive current collector 30 and the negative current collector 40 are folded many times into a zigzag-folding pattern. Specifically, in the first step of FIG. 5 and the second step of FIG. 6, the positive current collector 30 and the negative current collector 40 are disposed with dimensions increased in the folding direction (X direction or Y direction), and the steps from the third step of FIG. 7 to the sixth step of FIG. 10 are repeated many times. At this point, the bent portion 36 of the positive current collector 30 and the bent portion 46 of the negative current collector 40 are alternately disposed near the viewer and remote from the viewer in the folding directions.

Figure 12:
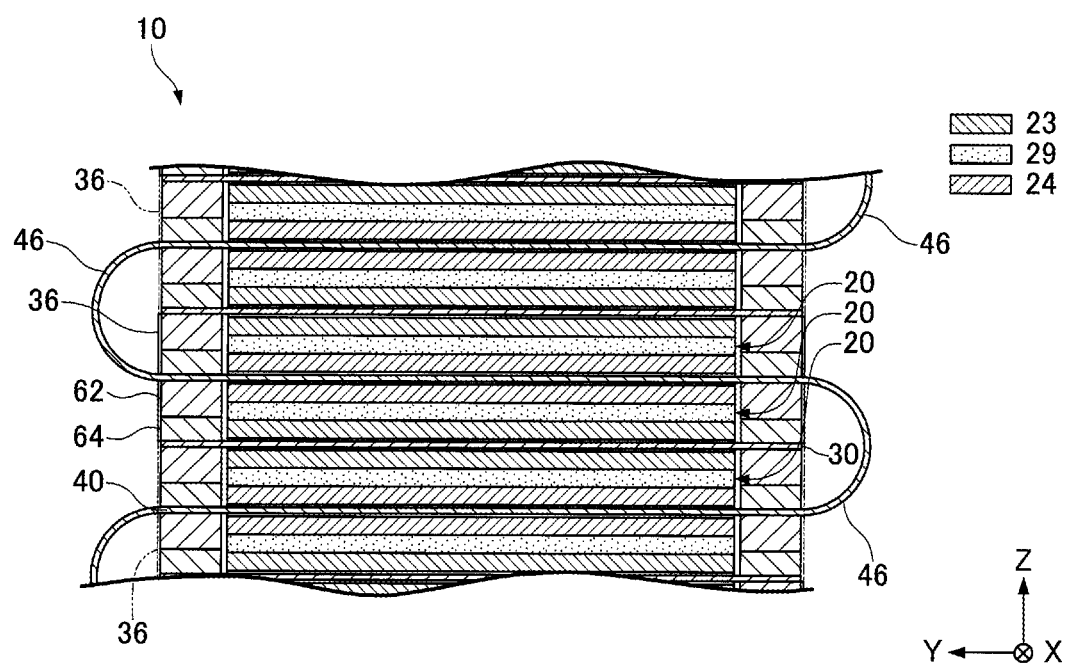
FIG. 12 is a cross-sectional view schematically illustrating the laminated structure of an all-solid-state battery in still another example of the embodiment according to the present invention.

FIG. 12 is a cross-sectional view illustrating a part of a laminated structure in which four or more electrode laminates 20 are stacked. As is evident from FIG. 12 in which the bent portion 46 of the negative current collector 40 appears alternately on the left and the right sides of FIG. 12, the four or more electrode laminates 20 are stacked with the positive current collector 30 and the negative current collector 40 folded into a zigzag-folding pattern. The folding directions of the positive current collector 30 and the negative current collector 40 cross each other, thereby preventing a contact (short circuit) between the positive current collector 30 and the negative current collector 40 even if the positive current collector 30 and the negative current collector 40 are folded into a zigzag-folding pattern. In FIG. 12, the positive current collector 30 is folded in a direction (a direction perpendicular to the plane of FIG. 12, X direction) that crosses the folding direction (a horizontal direction in FIG. 12, Y direction) of the negative current collector 40, and the bent portion 36 alternately appears near the viewer (virtual line) and remote from the viewer (solid line) with respect to the plane of FIG. 12.

If an interface resistance is sufficiently small between the positive current collector 30 and the negative current collector 40 and between the positive layer 23 and the negative layer 24, the electrode-layer contact members 34 and 44 in FIGS. 3 and 4 are not always necessary. If the interface between the positive layer 23 and the positive current collector 30 or the interface between the negative layer 24 and the negative current collector 40 has a large interface resistance, the electrode-layer contact member is desirably provided at least near the electrode.

If the positive current collector 30 and the negative current collector 40 are so thick that the mechanical strength of the positive deriving portion 32 and the negative deriving portion 42 can be sufficiently obtained without the reinforcing sealant film 54 or if the housing 50 is directly welded to the positive deriving portion 32 or the negative deriving portion 42 so as to provide sealing without the drawing-portion sealant film 52, it is not always necessary to bond the drawing-portion sealant film 52 and the reinforcing sealant film 54 to the positive deriving portion 32 and the negative deriving portion 42.

REFERENCE SIGNS LIST

10 All-solid-state battery
20 Electrode laminate
23 Positive layer
24 Negative layer
29 Solid-electrolyte layer
30 Positive current collector
34 Electrode-layer contact member
40 Negative current collector
44 Electrode-layer contact member
54 Reinforcing sealant film
62 Insulator

The invention claimed is:

1. An all-solid-state battery comprising a plurality of electrode laminates stacked in a thickness direction, the electrode laminates each including a positive layer, a negative layer, and a solid-electrolyte layer disposed between the positive layer and the negative layer,
the all-solid-state battery comprising a positive current collector, a negative current collector, and an insulator,
wherein the positive current collector is folded to electrically connect the positive layers of the electrode laminates,
wherein the negative current collector is folded to electrically connect the negative layers of the electrode laminates, and
wherein the insulator is disposed on all lateral sides of each of the plurality of electrode laminates so as to surround each of the plurality of electrode laminates on the all lateral sides.

2. The all-solid-state battery according to claim 1, wherein the positive current collector is folded into a zigzag-folding pattern so as to electrically connect the positive layers of the electrode laminates,
wherein the negative current collector is folded into a zigzag-folding pattern so as to electrically connect the negative layers of the electrode laminates, and
wherein the positive current collector and the negative current collector are disposed with folding directions crossing each other.

3. The all-solid-state battery according to claim 1, wherein the positive current collector has an edge partially protruding as a positive deriving portion for external electrical connection, and
wherein the negative current collector has an edge partially protruding as a negative deriving portion for external electrical connection.

4. The all-solid-state battery according to claim 3, further comprising a sealant film bonded to at least one surface of each of the positive deriving portion and the negative deriving portion.

5. The all-solid-state battery according to claim 1, further comprising an electrode-layer contact member disposed on at least one surface of each of the positive layer and the negative layer of the electrode laminate.

6. The all-solid-state battery according to claim 1, wherein the electrode laminates each include a plurality of electrode molded bodies stacked in series connection, the electrode molded bodies each including the positive layer, the negative layer, and the solid-electrolyte layer disposed between the positive layer and the negative layer.

7. A method for manufacturing an all-solid-state battery for manufacturing an all-solid-state battery according to claim 1, the plurality of electrode laminates including a first electrode laminate, a second electrode laminate, and a third electrode laminate, wherein the insulator includes a first insulator, a second insulator, and a third insulator, the method comprising:
a first step of disposing a positive current collector/negative current collector with the first insulator bonded to an edge of the positive current collector/negative current collector, the first step further including disposing the first electrode laminate such that a positive layer/negative layer of the first electrode laminate is in contact with the positive current collector/negative current collector and the first insulator surrounds the first electrode laminate;
a second step of disposing a negative current collector/positive current collector in contact with a negative layer/positive layer of the first electrode laminate, the second insulator bonded to an edge of the negative current collector/positive current collector;
a third step of disposing the second electrode laminate such that a negative layer/positive layer of the second electrode laminate is in contact with the negative current collector/positive current collector disposed in the second step and the second insulator surrounds the second electrode laminate;

a fourth step of folding the positive current collector/negative current collector in contact with a positive layer/negative layer of the second electrode laminate;

a fifth step of disposing the third electrode laminate such that a positive layer/negative layer of the third electrode laminate is in contact with the positive current collector/negative current collector folded in the fourth step and the third insulator surrounds the third electrode laminate; and a sixth step of folding the negative current collector/positive current collector in contact with a negative layer/positive layer of the third electrode laminate disposed in the fifth step.

8. The method for manufacturing an all-solid-state battery according to claim 7, wherein a folding direction in the fourth step and a folding direction in the sixth step cross each other.

\* \* \* \* \*